United States Patent [19]

[11] 3,740,744

[45] June 19, 1973

Nakada et al.

[54] DATA INPUT KEY APPARATUS

[75] Inventors: Yasuo Nakada, Tokyo; Yoshinori Tanaka, Kanagawa, both of Japan

[73] Assignee: Sony Corporation, Tokyo, Japan

[22] Filed: Feb. 2, 1972

[21] Appl. No.: 222,739

[30] Foreign Application Priority Data

Feb. 4, 1971 Japan .................................. 46/4332

[52] U.S. Cl. .......... 340/365 C, 340/365 E, 307/251

[51] Int. Cl. ............................................ H04l 15/06

[58] Field of Search ................... 340/365 C, 365 A, 340/365 E, 365 R

[56] References Cited

UNITED STATES PATENTS

| | | | |
|---|---|---|---|
| 3,668,698 | 6/1972 | Demirdjioghlou | 340/365 C |
| 3,676,607 | 7/1972 | Nash | 340/365 C |

*Primary Examiner*—Thomas B. Habecker

*Attorney*— Lewis H. Eslinger, Alvin Sinderbrand et al.

[57] ABSTRACT

A data input device for an electronic computer or calculator has an electro-mechanical transducer, preferably comprised of an electret and an electrode confronting each other with a gap therebetween which is narrowed by manual operation of a key, to electrostatically induce an electric charge by which a field effect transistor is controlled for producing an output, and a switch, preferably constituted by a second field effect transistor, for shunting the first mentioned field effect transistor and thereby removing the controlling electric charge from the latter so that only a single output is obtained from the first field effect transistor for each manual operation of the electro-mechanical transducer. A diode is further preferably connected between the electrode and ground potential and has its polarity arranged to remove the induced charge which remains on such electrode after the shunting operation of the second field effect transistor and the return of the electret and electrode to their normal spacing.

11 Claims, 5 Drawing Figures

DATA INPUT KEY APPARATUS

This invention relates generally to data input devices for electronic computers or calculators, and more particularly to key operated data input devices which can be included in a keyboard assembly of an electronic computer or desk-top calculator.

Keyboard assemblies of the described type generally comprise a plurality of electro-mechanical transducers which are rendered operative by depressing the respective key so as to provide electrical input signals or data to be fed into an associated computer or calculator. However, the existing keyboard assemblies are relatively complex and expensive and need to be associated with complex circuit arrangements. Further, in most of the existing keyboard assemblies, the keys must be depressed individually, that is one at a time, in order to provide a sequence of respective signals for feeding to the associated computer or calculator. In other words, if one key is depressed to provide the respective input signal to the computer or calculator and a second key is depressed prior to the complete release of the first key, the desired sequence of input signals corresponding to the first and second keys will not be obtained. Although a keyboard assembly has been developed which permits the keys to be successively depressed for obtaining a sequence of the respective input signals without requiring the release of the previously depressed key or keys, such previously proposed keyboard arrangement has an extremely complex circuit arrangement, and further imposes limitations on the speed at which the keys can be successively depressed for achieving the desired sequence of input signals to the associated computer or calculator.

Accordingly, it is an object of this invention to provide an improved data input device for an electronic computer or the like which can be incorporated in a keyboard assembly that avoids the above mentioned disadvantages of the previously employed keyboard assemblies.

Another object is to provide a key actuated data input device for an electronic computer or the like which is highly sensitive and yet simple and inexpensive.

A further object is to provide a keyboard assembly composed of keyboard units or data input devices which permit successive high speed actuation of the keys to achieve the desired sequence of respective input signals or data even though two or more of the keys may be simultaneously depressed.

Still another object is to provide a keyboard assembly as aforesaid, which employs a relatively simple circuit which is inexpensive to produce.

A still further object of the invention is to provide a keyboard assembly, as aforesaid, in which each of the data input devices or keyboard units is devoid of any switch contacts or other mechanically engageable parts which can exhibit wear with long continued use of the keyboard assembly.

More particularly, it is an object of the invention to provide a keyboard assembly, as aforesaid, in which the electro-mechanical transducer of each data input device or keyboard unit employs the phenomenon of electrostatic induction for initiating the production of the corresponding input signal, and more particularly in which the actuation of an associated key narrows a gap between an electret and a confronting electrode or electrodes so that a charge is electrostatically induced on the electrode or electrodes for initiating the production of a respective signal or signals.

In accordance with an aspect of this invention, a data input device for an electronic computer or the like comprises electromechanical transducing means which is manually operable, for example, by actuation of an associated key, for providing an electrical signal, a field effect transistor controlled by such electrical signal for providing an output in response to the occurrence of such electrical signal, and switching means, which is also preferably in the form of a field effect transistor, for shunting the first mentioned field effect transistor and thereby removing the electrical signal from the latter upon the appearance of the output from the first mentioned field effect transistor so that only a single output is obtained from the latter for each manual operation of the electro-mechanical transducing means.

In preferred embodiments of this invention, the electro-mechanical transducing means includes at least one electrostatically charged element, for example constituted by an electret, at least one electrode confronting the electret with a gap therebetween, and an actuating key which is manually operable to narrow the gap and thereby cause the electret to electrostatically induce a charge on the associated electrode for controlling the field effect transistor connected therewith.

In accordance with another feature of this invention, a diode is connected in parallel with the switching means and has its polarity arranged for removing from the electrode the charge which remains on the latter following the shunting of the field effect transistor by the switching means and the return of the electret and electrode to the normal gap width therebetween.

The above, and other objects, features and advantages of this invention, will be apparent in the following detailed description of illustrative embodiments thereof which is to be read in connection with the accompanying drawings, wherein.

Figure 1:
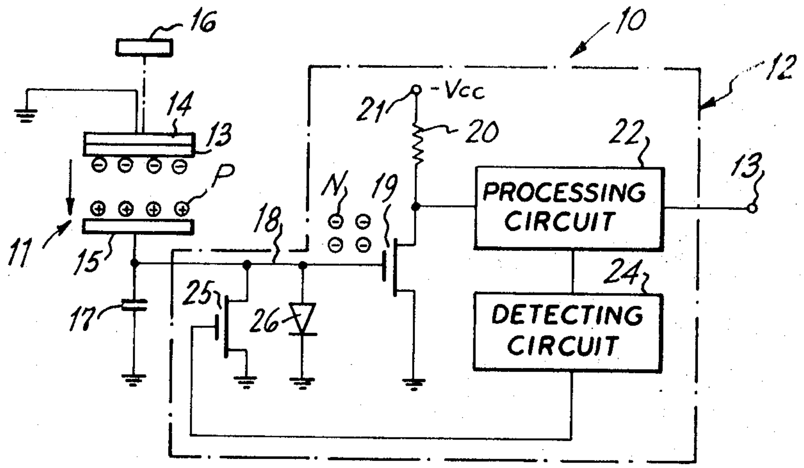
FIG. 1 is a diagrammatic view illustrating a data input device in accordance with one embodiment of this invention.

Referring to the drawings in detail, and initially to FIG. 1 thereof, it will be seen that a data input device 10 according to this invention for feeding respective signals to an electronic computer, calculator or the like generally comprises an electro-mechanical transducer 11 which is manually operable and a circuit arrangement 12 for producing an identifying output signal to be fed, as data input, to the associated computer or calculator (not shown) in response to manual operation of transducer 11.

In accordance with this invention, the transducer 11 includes an electrically charged element 13 preferably in the form of an electret which is permanently electrostatically charged, for example, with a negative charge, as shown, and which extends over a surface of a metal plate or electrode 14 connected to ground potential. A conductive electrode 15 is disposed in confronting relation to electret 13 with a gap therebetween, as shown, and a manually actuable key 16 is provided, for example, coupled with electrode 14, for moving electret 13 downwardly relative to electrode 15 and thereby narrowing the gap therebetween. In the normal relative position of electret 13 and electrode 15, to which such elements may be urged by a spring (not shown), the gap between electret 13 and electrode 15 is sufficiently wide so that the electrostatic charge carried by electret 13 will not be capable of electrostatically inducing a charge on electrode 15.

The electrode 15 is connected to ground potential through a capacitor 17 and further connected, by way of a conductor 18, to the gate of a field effect transistor (FET) 19 which is included in circuit arrangement 12. The drain of FET 19 is connected through a load resistor 20 to a terminal 21 connected with a suitable constant voltage source, and the source of FET 19 is connected directly to ground potential. The drain of FET 19 is further connected to a signal processing circuit 22 which, in response to the turning on of FET 19 and the consequent change in the potential at the drain of the latter, provides corresponding data input signals supplied to the output terminal 23 for feeding to the computer or calculator. The circuit arrangement 12 is further shown to include a detecting circuit 24 which detects the operation of processing circuit 22 and, in response thereto, simultaneously supplies a pulse signal to the gate of a second field effect transistor (FET) 25 having its drain and source respectively connected to conductor 18 and ground potential so that, when FET is turned on or rendered conductive, a shunt is provided between the gate of FET 19 and ground. The circuit arrangement 12 is completed by a diode 26 connected between conductor 18 and ground potential and having its polarity arranged as hereinafter described in detail.

The data input device 10 described above with reference to FIG. 1 operates as follows:

As previously mentioned, in the normal relative position of electret 13 and electrode 15, the gap therebetween is sufficiently wide so that the electrostatic charge carried by electret 13, and which is a negative charge in the example illustrated, will not be capable of inducing an electrostatic charge on confronting electrode 15. However, when key 16 is actuated to narrow the gap between electret 13 and electrode 15, the negative charge on electret 13 will repel electrons from electrode 15 along conductor 18 to provide a negative potential or charge N at the gate of FET 19 and a substantially equal positive charge P on electrode 15 by the phenomenon of electrostatic induction. The negative potential or charge at the gate of FET 19 will turn on the latter and thereby change the potential at its drain so that processing circuit 22 will be operative to produce a respective data input signal which is supplied to output terminal 23. The detecting circuit 24 detects the operation of processing circuit 22 and simultaneously supplies a single pulse of predetermined duration to the gate of FET 25. During the reception of the pulse from detecting circuit 24 at the gate of FET 25, the latter is turned on or rendered conductive with the result that the negative charge N at the gate of FET 19 constituted by unbound electrons instantaneously flows off to ground through conductive FET 25. Thus, the FET 19 is returned to its original off or non-conductive state even though the key 16 may still be depressed to narrow the gap between electret 13 and electrode 15. The period during which FET 19 is in its on or conductive state to cause processing circuit 22 to produce the respective data input signal in response to actuation of the key 16 may be very short, for example, less than twenty microseconds, which period is very much shorter than the period during which the key 16 would be normally depressed for narrowing the gap between electret 13 and electrode 15.

Upon the conclusion of the single pulse issuing from detecting circuit 24 for turning FET 25 to its on or conductive state, the FET returns to its normal off or non-conductive state. The period during which FET 25 is rendered conductive by the single pulse from detecting circuit 24 is, of course, shorter than the period during which key 16 is normally depressed to narrow the gap between electret 13 and electrode 15. Thus, electret 13 remains close to electrode 15 during the period when FET 25 is conductive so that the positive charge P induced on electrode 15 is bound by the negative charge on the adjacent electret 13 by reason of the fact that unlike charges attract each other. When key 16 is released to return to its original position, and hence to increase the distance between electret 13 and electrode 15 to the normal gap width therebetween, the positive charge P remaining on electrode 15 is no longer bound or attracted by the negative charge on electret 13, and the positive charge P is removed from electrode 15 through diode 26. The diode 26 is shown in FIG. 1 to conduct current in the direction from conductor 18 toward ground in accordance with the convention that assumes an electric current to flow in the direction of motion of the positive charges, which direction is opposite to the actual flow of electrons. Thus, with diode 26 arranged as shown on FIG. 1, electrons can flow therethrough only in the direction from ground potential toward conductor 18 for removing the positive charge P that remains on electrode 15 following the return of key 16 to its normal or original position and, hence, the negative charge N which appears at the gate of FET 19 as a result of electrostatic induction when key 16 is first actuated cannot flow off through diode 26.

The removal through diode 26 of the positive charge P remaining on electrode 15 when key 16 returns to its original position restores data input device 10 to its starting condition, that is, FETs 19 and 25 are both in the off or non-conductive state and electrode 15 and conductor 18 are substantially at ground potential. In removing the positive charge P that remains on electrode 15 upon the return of key 16 to its original position, diode 26 ensures that the positive charge P on electrode 15 will not build up through successive actuations of key 16 to a level at which such charge could cause damage to FET 25 by exceeding the breakdown voltage thereof.

Since the period during which FET 19 is in its on or conductive state, and hence the period during which processing circuit 22 emits the respective data input signal, is very short, for example, less than 20 microseconds, and is, in any case, independent of the length of time during which key 16 is maintained in its depressed condition, it will be apparent that a keyboard assembly may be made up of a number of the data input devices 10, and that the keys 16 of such devices 10 may be successively actuated to provide a sequence of the respective date input signals at the respective output terminals 23 even though one or more of the keys 16 may be actuated or depressed at a time when at least one of the other keys 16 is still in its depressed condition. It is further to be noted that, since the occurrence of the data input signal at the output terminal 23 depends upon the period during which FET 19 is in its on or conductive state, which period is automatically predetermined by the pulse from detecting circuit 24 for rendering FET 25 conductive, the data input signal appearing at output terminal 23 will not be affected by momentary sticking or chattering of the respective key 16. Further, since the data input device 10 according to this invention employs the electrostatically charged element or electret 13 for producing the negative charge N or electrical signal by which FET 19 is controlled, it will be apparent that the power consumption of the device 10 is relatively small.

Figure 2:
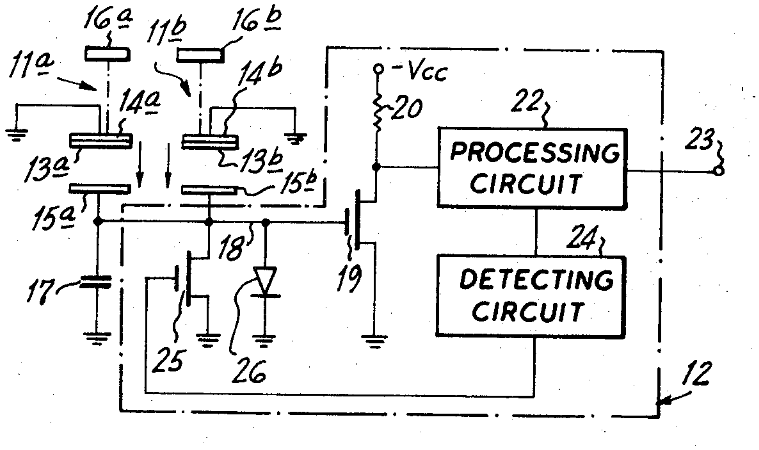
FIG. 2 is a diagrammatic view illustrating another embodiment of this invention in which an output is obtained when any one of a plurality of keys is actuated.

Referring now to FIG. 2, it will be seen that, in accordance with this invention, two or more key-actuated electromechanical transducers, for example, as indicated at 11*a* and 11*b*, may be combined with a single circuit arrangement 12 to provide the respective data input signal at output terminal 23 whenever a selected one of the keys 16*a* and 16*b* of transducers 11*a* and 11*b*, respectively, is actuated. The transducers 11*a* and 11*b* are shown to be the same as the transducer 11 described above with reference to FIG. 1 and have their several parts identified by the same reference numerals but with the letters *a* and *b* respectively appended thereto. In the arrangement shown on FIG. 2, the electrodes 15*a* and 15*b* of transducers 11*a* and 11*b* are both connected to ground through the capacitor 17 and also both connected to the conductor 18 which extends from circuit arrangement 12.

The arrangement of FIG. 2 operates in the same manner as has been described above with reference to FIG. 1. Hence, when either of the keys 16*a* and 16*b* is depressed to narrow the gap between the respective electret 13*a* or 13*b* and electrode 15*a* or 15*b*, the electrical charge produced at the gate of FET 19 by electrostatic induction turns on FET 19 and, in response thereto, processing circuit 22 provides the respective data input signal at output terminal 23 and detecting circuit 24 responds to such signal to produce the single pulse by which FET 25 is momentarily rendered conductive to remove the charge from the gate of FET 19 for returning the latter to its off state. Since FET 19 is rendered conductive for only a very short period, for example, less than twenty microseconds, in response to each actuation of the key 16*a* or 16*b*, it will be apparent that the successive actuation of the keys 16*a* and 16*b* will cause a sequence of the respective data input signals to appear at the output terminal 23 even if key 16*b* is depressed prior to the return of key 16*a* to its original or raised position.

Figure 3:
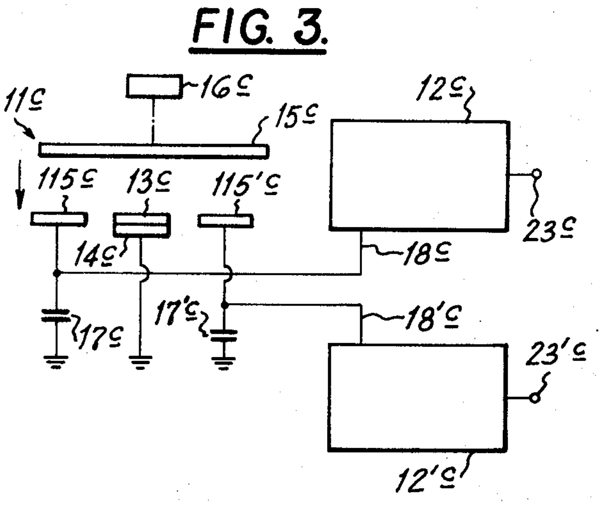
FIG. 3 is a diagrammatic view illustrating still another embodiment of this invention in which two output signals are obtained when a single key is actuated.

Referring now to FIG. 3, it will be seen that, in accordance with this invention, an arrangement may be provided for simultaneously producing two or more data input signals in response to the actuation of a single electro-magnetic transducer 11*c*. In the embodiment shown on FIG. 3, the transducer 11*c* is shown to include a charged element or electret 13*c* mounted on a fixed electrode 14*c* which is connected to ground potential and which confronts a movable electrode 15*c* with a gap therebetween which is narrowed in response to the actuation or depression of a key 16*c* suitably coupled to electrode 15*c*. Further, additional fixed electrodes 115*c* and 115'*c* are mounted at opposite sides of electret 13*c* and also confront the movable electrode 15*c*. The fixed electrodes 115*c* and 115'*c* are shown to be connected to ground potential through capacitors 17*c* and 17'*c*, respectively, and also connected to conductors 18*c* and 18'*c* extending to circuit arrangements 12*c* and 12'*c* which may be the same as the circuit arrangement 12 described above with reference to FIG. 1.

In the arrangement of FIG. 3, the electret 13*c* may carry a positive charge so that, when key 16*c* is depressed to narrow the gap between electret 13*c* and electrode 15*c* and also the gaps between electrode 15*c* and electrodes 115*c* and 115'*c*, the positive charge on electret 13*c* will produce a negative charge on the surface of electrode 15*c* by electrostatic induction, and the negative charge on the surface of electrode 15*c* will repel electrons from electrodes 115*c* and 115'*c* to produce a positive charge on the last mentioned electrodes, similar to the positive charge P produced on the electrode 15 of FIG. 1. Thus, upon the actuation of key 16*c*, the circuit arrangements 12*c* and 12'*c* will be effective to simultaneously provide respective data input signals at their output terminals 23*c* and 23'*c*.

Figure 4:
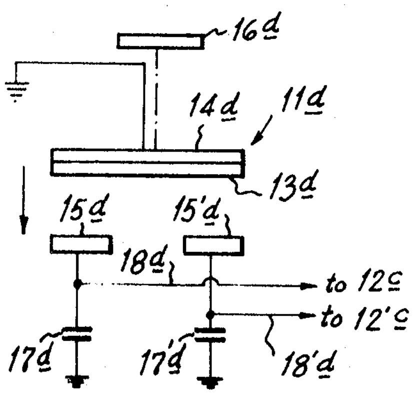
FIG. 4 is a diagrammatic view illustrating another arrangement for obtaining two output signals upon the actuation of a single key.

Referring now to FIG. 4, it will be seen that, in another embodiment of this invention for providing two data input signals in response to the actuation of a single electro-mechanical transducer, such transducer 11*d* may include an electret 13*d* which is, for example, negatively charged as in the embodiment of FIG. 1, and which is mounted on a movable electrode 14*d* suitably coupled with a key 16*d*. The transducer 11*d* is further shown to include two fixed electrodes 15*d* and 15'*d* confronting electret 13*d* with a gap therebetween which is narrowed in response to actuation or depression of key 16*d*. The fixed electrodes 15*d* and 15'*d* are shown to be connected to ground potential through respective capacitors 17*d* and 17'*d* and further connected to conductors 18*d* and 18'*d* extending to respective circuit arrangements 12*c* and 12'*c* which are each similar to the circuit arrangement 12 of FIG. 1. It will be apparent that, with the arrangement shown on FIG. 4, actuation of key 16*d* for narrowing the gap between electret 13*d* and 313ctrodes 15*d* and 15'*d* causes electrons to be repelled from those electrodes and thereby initiates the operation of circuit arrangements 12*c* and 12'*c* for simultaneously producing the respective data input signals at the output terminals of such circuit arrangements.

Figure 5:
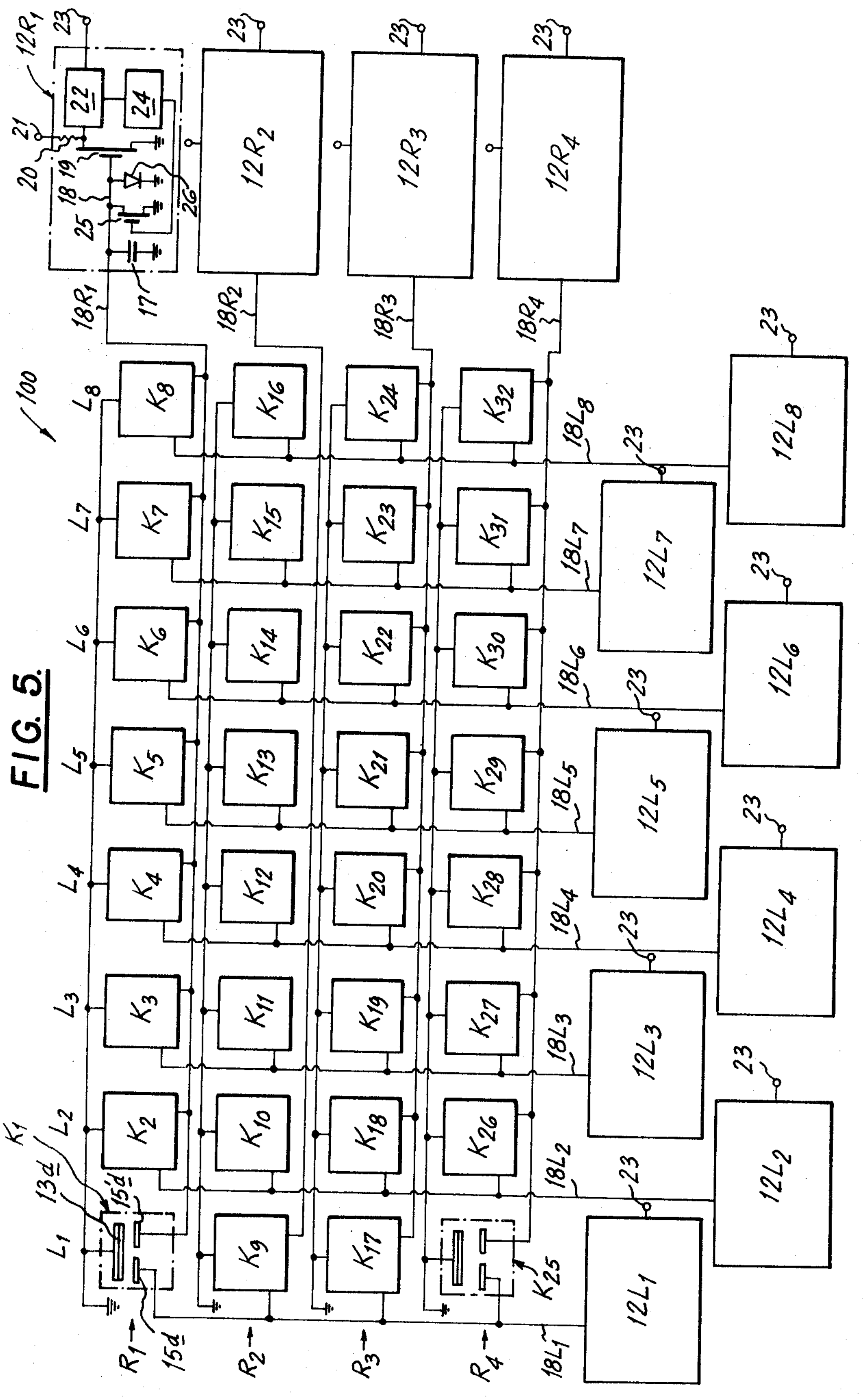
FIG. 5 is a diagrammatic view illustrating a keyboard assembly in accordance with this invention composed of data input devices or keyboard units of the type illustrated on FIG. 4.

Referring now to FIG. 5, it will be seen that, in a keyboard assembly 100 according to this invention, as there illustrated, 32 key operated electro-mechanical transducers $K_1$–$K_{32}$ each of which may be of the type described above with reference to FIG. 4, are arranged in four rows $R_1$–$R_4$ and eight lines $L_1$–$L_8$. For circuit arrangements 12$R_1$–12$R_4$, each of which may be similar to the circuit arrangement 12 of FIG. 1, are respectively associated with the four rows $R_1$–$R_4$, and eight circuit arrangements 12$L_1$–12$L_8$, each also being similar to the circuit arrangement 12 of FIG. 1, are respectively associated with the lines $L_1$–$L_8$. As shown particularly with respect to the transducers $K_1$ and $K_{25}$, each of the transducers $K_1$–$K_{32}$ has its electrode 15*d* connected to a conductor $18L_1$–$18L_8$ extending to the circuit arrangement $12L_1$–$12L_8$, respectively, associated with the line in which the particular tranducer is located and, similarly, the electrode 15'*d* of each of the transducers is connected to a conductor $18R_1$–$18R_4$ extending to the respective circuit arrangement $12R_1$–$12R_4$ associated with the row $R_1$–$R_4$ in which the particular transducer is located.

With the keyboard apparatus shown on FIG. 5, it will be apparent that, when, for example, the key of transducer $K_1$ is actuated, the circuit arrangements $12R_1$ and $12L_1$ respectively associated with row $R_1$ and line $L_1$ will be operative to provide respective data input signals at their output terminals 23. Similarly, if the key of transducer $K_{25}$ is actuated, the circuit arrangements $12R_4$ and $12L_1$ will be operative to provide respective data input signals at their output terminals. Thus, in response to the actuation of any of the transducers $K_1$–$K_{32}$, data input signals will be provided by the circuit arrangements associated with the row and line in which the actuated transducer is located and such simultaneously produced data input signals will indicate the actuated key operated transducer. The various key-operated transducers $K_1$–$K_{32}$ can be made to respectively represent the integers 0 to 9, and various operations to be performed by the associated computer or calculator, such as, addition, subtraction, division, multiplication, and so forth. It will be apparent that the keyboard assembly shown on FIG. 5 has all of the advantages of the individual data input devices previously described herein and further employs a relatively simple and inexpensive circuit arrangement.

Although illustrative embodiments of this invention have been described in detail herein with reference to the drawings, it is to be noted that the invention is not limited to those precise embodiments, and that various changes and modifications may be effected therein by one skilled in the art without departing from the scope or spirit of this invention.

What is claimed is:

1. A data input device for an electronic computer or the like, comprising electro-mechanical transducing means including at least one electrostatically charged element, at least one electrode confronting said charged element with a gap therebetween and actuating key means which is manually operable for narrowing said gap and thereby causing said charged element to electrostatically induce a charge on said electrode, a field effect transistor which is normally in a non-conductive state, conductive means connected between said electrode and the gate of said transistor for providing a charge at said gate of opposite polarity to said charge induced on the electrode and by which said transistor is rendered conductive, means for providing an output signal in response to said transistor being rendered conductive, and switch means connected between said conductive means and ground and controlled in response to said output signal for removing said charge of opposite polarity from said gate and thereby returning said transistor to said non-conductive state even if operation of said actuating key means is continued.

2. A data input device according to claim 1; in which said electro-mechanical transducing means has a second electrostatically charged element and a second electrode confronting said second charged element with a gap therebetween, said actuating key means is manually operable to selectively narrow the gap between said one charged element and one electrode and the gap between said second charged element and second electrode, and said field effect transducer is controlled in response to the charge induced selectively on said one and second electrodes in response to the narrowing of the respective gap.

3. A data input device according to claim 1, in which said electro-mechanical transducing means has a second electrode confronting said charged element with a gap therebetween which is also narrowed upon manual operation of said actuating key means to electrostatically induce a charge on said second electrode, and further comprising a second field effect transistor controlled by said charge induced on said second electrode for providing a second output, and second switching means for shunting said second field effect transducer and thereby removing the controlling charge therefrom upon the appearance of said second output.

4. A data input device according to claim 1, in which a processing circuit is connected with said field effect transistor for producing a characteristic output signal in response to said output from said field effect transistor, and a detecting circuit detects said output signal from the processing circuit and produces a pulse for controlling said switching means.

5. A data input device according to claim 1, further comprising a diode connected between said conductive means and ground and having its polarity arranged for removing from said electrode the charge which remains on the latter following the removal of said charge of opposite polarity through said switch means and the return of said charged element and electrode to the normal gap width therebetween.

6. A data input device according to claim 5, in which said charged element is an electret.

7. A data input device according to claim 5, in which said switch means includes a second field effect transistor, and means for detecting said output signal and rendering said second field effect transistor conductive for a pulse period.

8. A data input keyboard assembly for an electronic computer or the like, comprising a plurality of keyboard units arranged in rows and lines, each of said keyboard units including an electrically charged element, first and second electrodes confronting said charged element with a gap therebetween and actuating key means which is manually operable for narrowing said gap and thereby causing said charged element to electrostatically induce a charge on each of said first and second electrodes, a first field effect transistor for each of said rows of keyboard units, a second field effect transistor for each of said lines of keyboard units, conductive means connecting the gates of said first and second field transistors with said first and second electrodes, respectively, of the keyboard units located in the corresponding rows and lines, respectively, and by which said charge induced on said first and second electrodes of any one of said keyboard units produces a charge of opposite polarity at the gates of said first and second field effect transistors connected therewith for providing respective outputs from the latter, and switch means in shunting association with the gate of each of said first and second field effect transistors for removing said charge of opposite polarity therefrom upon the appearance of said output from the respective field effect transistor and thereby halting said output from said respective field effect transistor even if operation of the actuating key means of a keyboard unit associated therewith is continued.

9. A data input keyboard assembly according to claim 8, in which said switch means for each of said first and second field effect transistors includes an additional field effect transistor.

10. A data input keyboard assembly according to claim 8, further comprising a diode connected in parallel with each of said switch means and having its polarity arranged for removing the charge that remains on any of the electrodes connected with the respective field effect transistors following the shunting of said respective field effect transistors through the switch means and the return of the respective charged element and electrodes to the normal gap width therebetween.

11. A data input keyboard assembly according to claim 8, in which said charged element of each keyboard unit is an electret.

* * * * *